(12) United States Patent
Rao et al.

(10) Patent No.: US 11,163,718 B2
(45) Date of Patent: Nov. 2, 2021

(54) MEMORY LOG RETRIEVAL AND PROVISIONING SYSTEM

(71) Applicant: Dell Products L.P., Round Rock, TX (US)

(72) Inventors: Sanjay Rao, Austin, TX (US); Divya Vijayvargiya, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 16/174,380

(22) Filed: Oct. 30, 2018

(65) Prior Publication Data

US 2020/0133911 A1 Apr. 30, 2020

(51) Int. Cl.
*G06F 15/167* (2006.01)
*H04L 29/08* (2006.01)
*H04L 12/24* (2006.01)

(52) U.S. Cl.
CPC ........ *G06F 15/167* (2013.01); *H04L 41/0806* (2013.01); *H04L 67/10* (2013.01)

(58) Field of Classification Search
CPC .... G06F 15/167; H04L 41/0806; H04L 67/10
See application file for complete search history.

(56) References Cited

U.S. PATENT DOCUMENTS

| | | | |
|---|---|---|---|
| 7,155,514 B1* | 12/2006 | Milford | H04L 41/06 709/225 |
| 7,379,846 B1 | 5/2008 | Williams et al. | |
| 9,298,569 B1* | 3/2016 | Crisp | G06F 11/0748 |
| 9,760,480 B1* | 9/2017 | McKelvie | G06F 12/0246 |
| 10,496,510 B2* | 12/2019 | Ganesan | G06F 11/3072 |
| 2002/0184366 A1* | 12/2002 | Kimoto | A63F 13/79 709/224 |
| 2003/0079007 A1* | 4/2003 | Merkin | G06F 11/0745 709/223 |
| 2003/0097617 A1* | 5/2003 | Goeller | G06F 11/0748 714/39 |
| 2003/0208654 A1* | 11/2003 | Krontz | G06F 11/0787 710/312 |
| 2005/0141566 A1* | 6/2005 | Krzyzanowski | H04L 12/2805 370/503 |
| 2007/0016827 A1* | 1/2007 | Lopez, Jr. | G06F 11/2294 714/31 |

(Continued)

*Primary Examiner* — James A Edwards
(74) *Attorney, Agent, or Firm* — Joseph Mencher

(57) ABSTRACT

A memory log retrieval and provisioning system includes a server device that is coupled to a support system via a network. The server device includes a memory device having at least one memory log. A memory log retrieval and provisioning subsystem is coupled to the memory device, and determines that a memory log retrieval event has occurred in the server device. In response to determining that the memory log retrieval event has occurred, the memory log retrieval and provisioning subsystem automatically retrieves the at least one memory log from the memory device without receiving user instructions subsequent to detecting the memory log retrieval event. The memory log retrieval and provisioning subsystem then automatically transmits the at least one memory log through the network to the support system without receiving user instructions subsequent to automatically retrieving the at least one memory log.

17 Claims, 5 Drawing Sheets

(56) References Cited

U.S. PATENT DOCUMENTS

| | | | |
|---|---|---|---|
| 2007/0115709 A1* | 5/2007 | Shih | G06F 11/2289 |
| | | | 365/63 |
| 2017/0060706 A1* | 3/2017 | Kinoshita | G06F 11/1666 |
| 2018/0260342 A1* | 9/2018 | Thangaraj | G06F 11/34 |
| 2020/0042422 A1* | 2/2020 | Togawa | G06F 11/3452 |

* cited by examiner

MEMORY LOG RETRIEVAL AND PROVISIONING SYSTEM

BACKGROUND

The present disclosure relates generally to information handling systems, and more particularly to retrieving and provisioning memory logs from an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, include memory systems having a plurality of memory devices such as, for example, Dual Inline Memory Modules (DIMMs). Each of those memory devices may include memory logs that may, for example, store memory data such as Serial Presence Detect (SPD) data that provide SPD logs in an SPD Electrically Erasable Programmable Read-Only Memory (EEPROM) that is included in the memory device. In many situations, the memory data may be generated and stored in the memory logs in response to events occurring in the memory device, and thus may provide information about those critical events. However, the retrieval of such memory data in the memory logs raises a number of issues. For example, in server devices including server components manufactured by Advanced Micro Devices (AMD®) of Santa Clara, Calif., United States, there is no conventional method for accessing the SPD logs on DIMMs included in those server devices. Furthermore, in server devices including server components manufactured by INTEL® corporation of Santa Clara, Calif., United States, an operating system tool must be installed in the operating system provided on the server device in order to access the SPD logs on the DIMMs. As such, when a critical event occurs in a DIMM included in a server device having INTEL® server components, a customer support system must request that the customer retrieve the OS tool, and/or provide that OS tool to the customer, so that the customer may install that OS tool on the operating system provided on the server device in order to retrieve the SPD logs from that DIMM, and then that customer must send the SPD logs to the customer support system (e.g., via email.) Thus, memory logs in memory devices are inaccessible in some server devices, or require manual, time consuming processes in order to be accessed and provided for support.

Accordingly, it would be desirable to provide an improved memory log retrieval and provisioning system.

SUMMARY

According to one embodiment, an Information Handling System (IHS) includes a memory device; and a memory log retrieval and provisioning subsystem that is coupled to the memory device and that is configured to: determine that a memory log retrieval event has occurred; automatically retrieve, without user instructions subsequent to detecting the memory log retrieval event and in response to determining the memory log retrieval event has occurred, at least one memory log from the memory device; and automatically transmit, without user instructions subsequent to automatically retrieving the at least one memory log, the at least one memory log through a network to a support system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
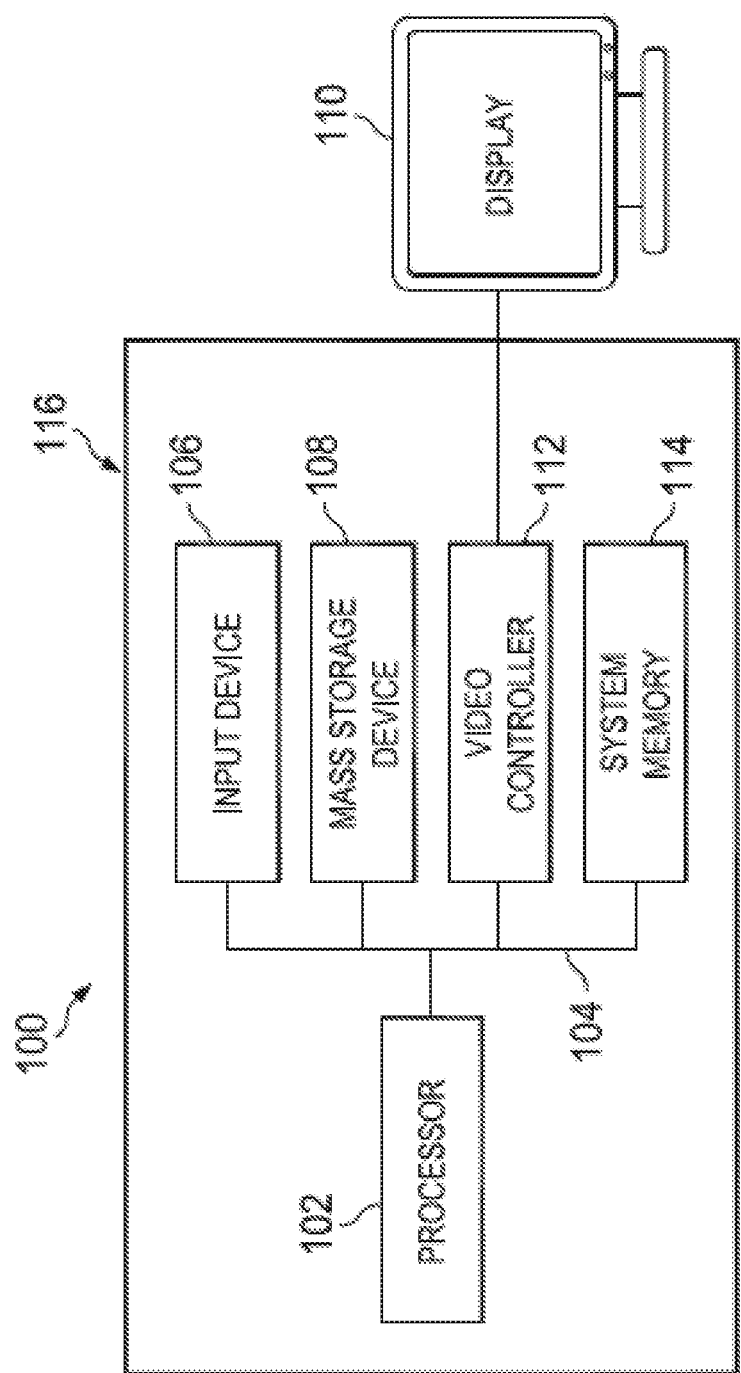
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
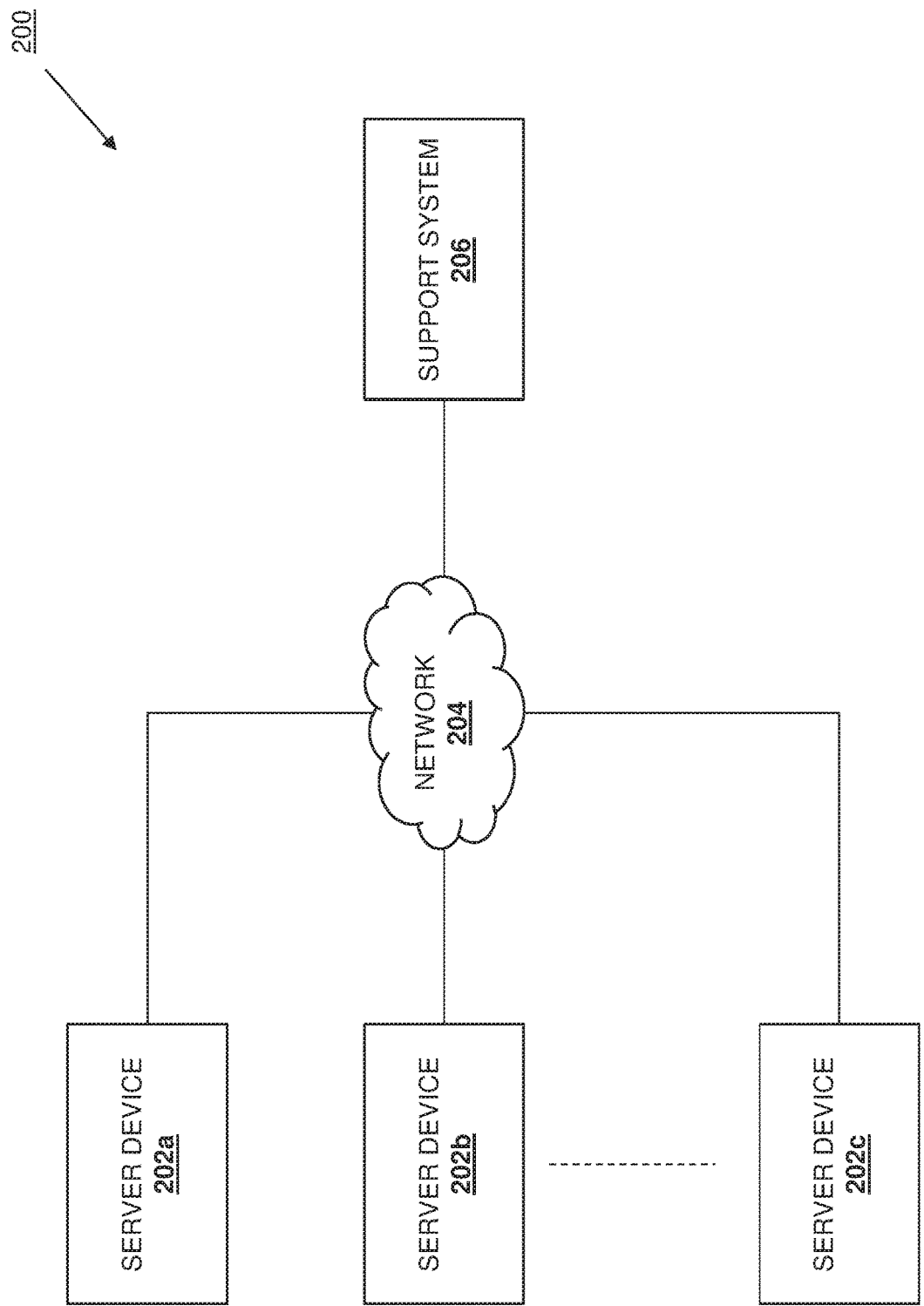
FIG. 2 is a schematic view illustrating an embodiment of a network including server devices coupled to a support system.

Referring now to FIG. 2, an embodiment of a network 200 is illustrated that may be utilized to perform the memory log retrieval and provisioning of the present disclosure. In the illustrated embodiment, the network 200 includes a plurality of server devices 202a, 202b, and up to 202c. Any or all of the server devices 202a-c may be provided by the IHS 100 discussed above with reference to FIG. 1, and/or may include some or all of the components of the IHS 100. However, while the computing devices that provide the memory log retrieval and provisioning of the present disclosure are illustrated and described below as server devices, one of skill in the art in possession of the present disclosure will recognize that other types of devices including networking devices, storage devices, desktop computing devices laptop/notebook computing devices, tablet computing devices, mobile phones, and/or other computing devices known in the art may include memory devices and thus will benefit from the teachings of the present disclosure as well. Each of the server devices 202a-c may be coupled to a network 204 that may be provided by Local Area Networks (LANs), the Internet, and/or a variety of other networks that would be apparent to one of skill in the art in possession of the present disclosure. A support system 206 is also coupled to the network 204, and may include one or more support devices (e.g., server devices and/or other computing devices) that are configured to provide the support for the server devices 202a-c discussed below. For example, the support system 206 may operate to provide SUPPORTASSIST® available from DELL® Inc. of Round Rock, Tex., United States. However, while a specific network 200 has been illustrated and described for performing the memory log retrieval and provisioning of the present disclosure, one of skill in the art in possession of the present disclosure will recognize that the memory log retrieval and provisioning described herein may be performed in a variety of networks having a variety of devices in a variety of device configurations while remaining within the scope of the present disclosure as well.

Figure 3:
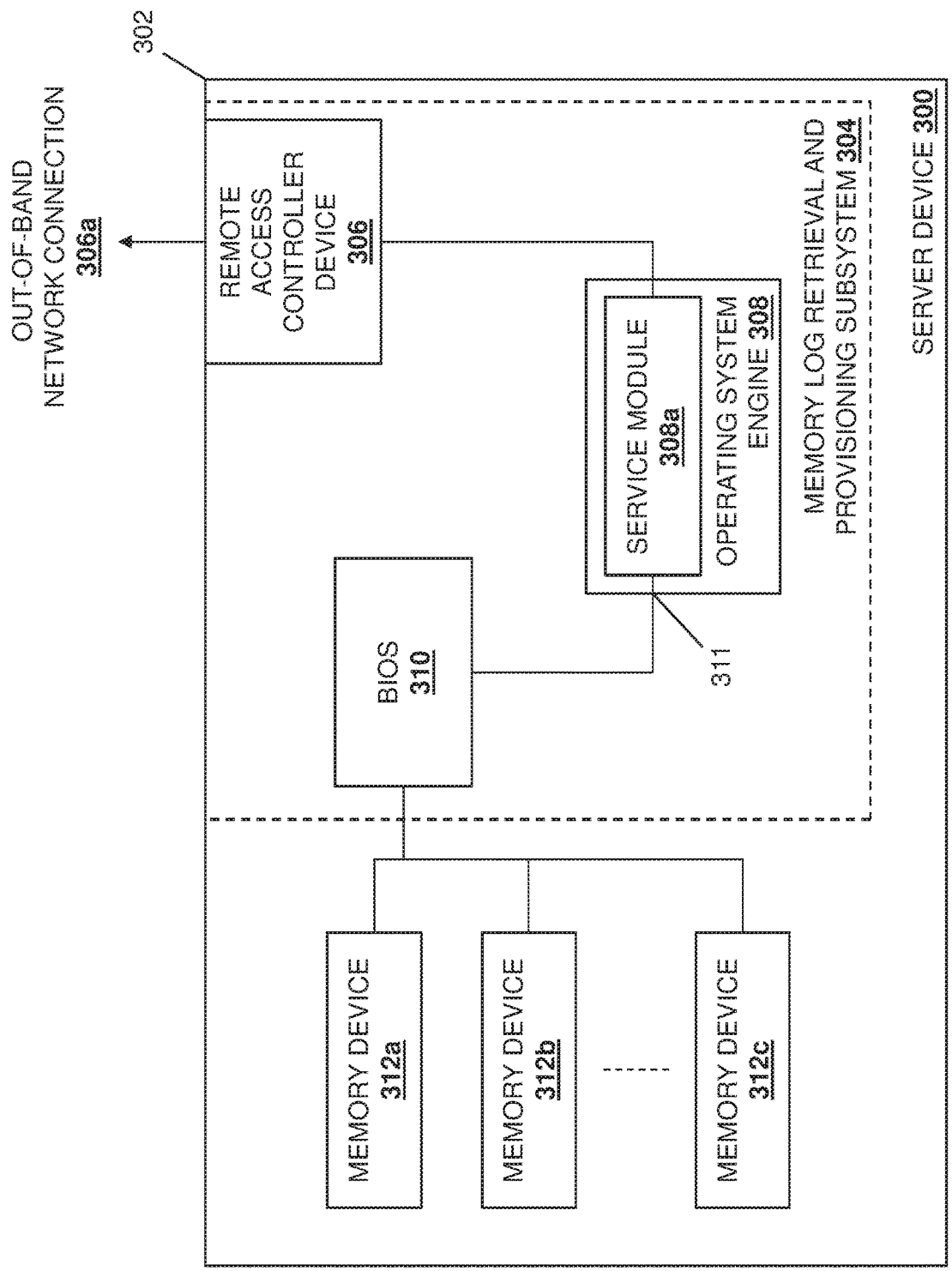
FIG. 3 is a schematic view illustrating a server device that may be provided in the network of FIG. 2 and that may include a first embodiment of the memory log retrieval and provisioning system of the present disclosure.

Referring now to FIG. 3, an embodiment of a server device 300 is illustrated that may be any of the server devices 202a-c discussed above in the network 200 of FIG. 2, and that provides a specific example of the memory log retrieval and provisioning system of the present disclosure. For example, one of skill in the art in possession of the present disclosure will recognize that the server device 300 may be a server device included as part of a variety of server platforms that include server components provided by INTEL® corporation of Santa Clara, Calif., United States. In the illustrated embodiment, the server device 300 includes a chassis 302 that houses the components of the server device 300, only some of which are illustrated in FIG. 3. For example, the chassis 302 may house a memory log retrieval and provisioning subsystem 304 that, in the illustrated embodiment, includes a remote access controller device 306 that may be provided by an integrated DELL® Remote Access Controller (iDRAC) available from DELL® Inc. of Round Rock, Tex., United States. The remote access controller device 306 includes an out-of-band network connection 306a that may be coupled to the network 204 of FIG. 2, and that one of skill in the art in possession of the present disclosure will recognize is separate from an in-band network connection (not illustrated, but which may include a Network Interface Controller (NIC)) provided for the server device 300. However, one of skill in the art in possession of the present disclosure will recognize that the remote access controller device 306 may be provided by a Baseboard Management Controller (BMC) and/or other components with similar functionality to that described below while remaining within the scope of the present disclosure as well. The memory log retrieval and provisioning subsystem 304 may also include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an operating system engine 308 that is configured to provide an operating system for the server device 300, as well as perform the other functionality discussed below.

In the illustrated embodiment, a service module 308a is included in the operating system engine 308 via, for example, instructions included on the memory system that, when executed by the processing system, cause the processing system to provide the service module 308a that is configured to perform the functions of the service modules discussed below. For example, the service module 308a may be provided by an integrated DELL® Remote Access Controller (iDRAC) service module (iSM) available from DELL® Inc. of Round Rock, Tex., United States. As would be understood by one of skill in the art, the iSM available from DELL® Inc. provides a lightweight software service that integrates OS features with the iDRAC available from DELL® Inc., and include functionality such as providing OS information to the iDRAC, adding capabilities such as lifecycle log event replication into the operating system log, WINDOWS® Management Instrumentation (WMI) support (including storage), iDRAC Simple Network Management Protocol (SNMP) alerts via the operating system, iDRAC hard reset and remote full power cycle capabilities, the automated report collection processes discussed below, and other functionality, while producing relatively little impact on the processing system (and relatively small footprint in the memory system).

The memory log retrieval and provisioning subsystem 304 may also include a Basic Input/Output System (BIOS) 310 that is coupled to the operating system engine 308 (and, as illustrated, the service module 308a) via a System Management Interrupt (SMI) interface 311. As would be understood by one of skill in the art in possession of the present disclosure, the BIOS 310 may include non-volatile firmware that is configured to perform hardware initialization for components in the server device 300 during a booting process for the service device 300, as well as runtime services for the operating system provided by the operating system engine 308, and applications provided via that operating system. The chassis 302 may also house a plurality of memory devices 312a, 312b, and up to 312c, any or all of which may be provided by Dual Inline Memory Modules (DIMMS), although other memory devices will benefit from the teachings of the present disclosure and thus are envisioned as falling within its scope as well. Each of the memory devices are coupled to the memory log retrieval and provisioning subsystem 304 via, for example, the coupling to the BIOS 310 illustrated in FIG. 3. Furthermore, as discussed below, each of the memory devices 312a-c may include a storage device (e.g., an Electrically Erasable Read Only Memory (EEPROM) device) that is configured to store memory logs (e.g., Serial Presence Detect (SPD) logs) generated in response to the operation of that memory device. While a specific server device 300 has been illustrated and described, one of skill in the art will recognize that server devices may include a variety of components and/or component configurations for performing conventional server device functionality, as well as the functionality discussed below, while remaining within the scope of the present disclosure as well.

Figure 4:
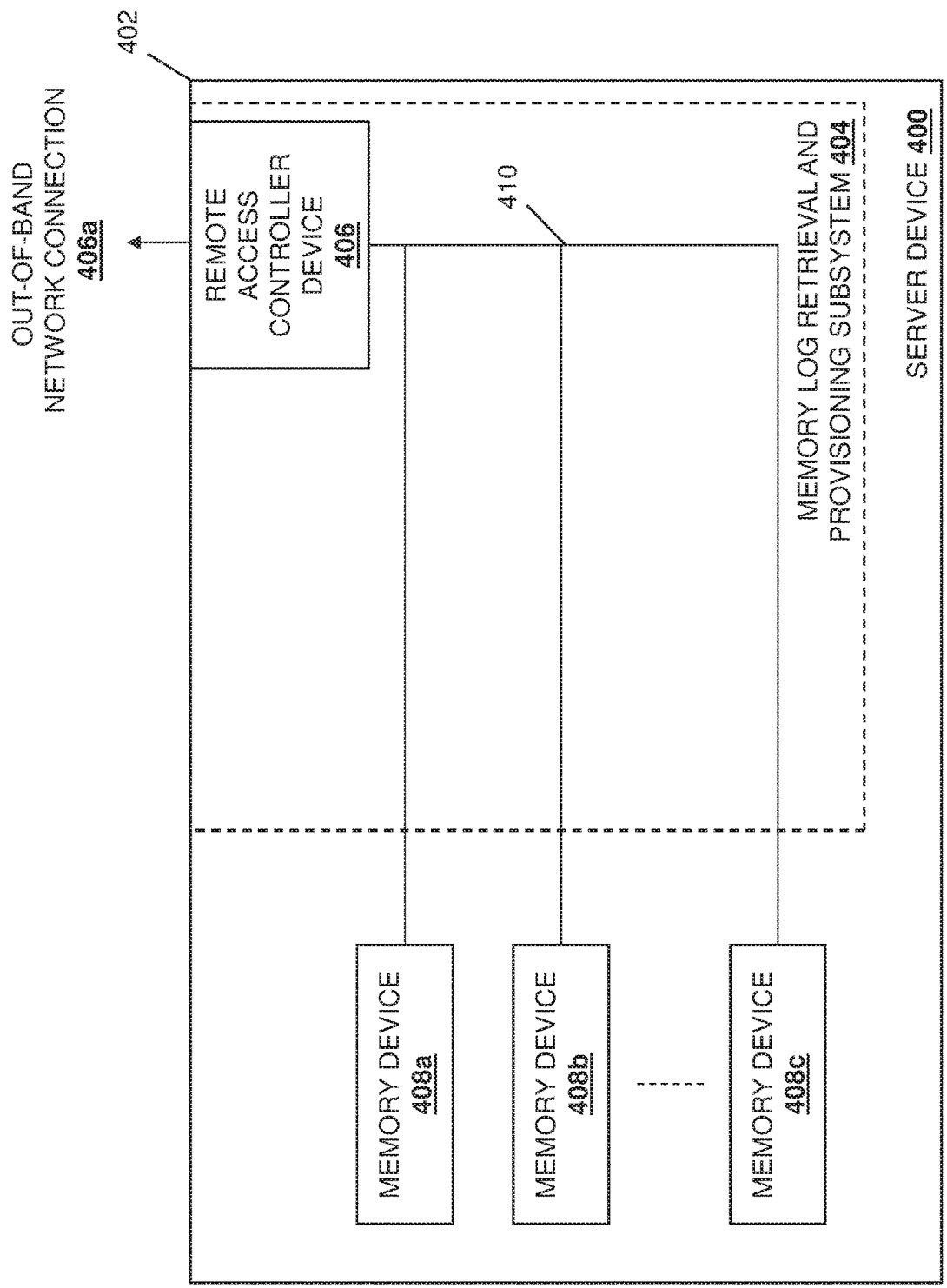
FIG. 4 is a schematic view illustrating an server device that may be provided in the network of FIG. 2 and that may include a second embodiment of the memory log retrieval and provisioning system of the present disclosure.

Referring now to FIG. 4, an embodiment of a server device 400 is illustrated that may be any of the server devices 202a-c discussed above in the network 200 of FIG. 2, and that provides a specific example of the memory log retrieval and provisioning system of the present disclosure. For example, one of skill in the art in possession of the present disclosure will recognize that the server device 400 may be a server device included as part of a variety of server platforms that include server components provided by Advanced Micro Devices (AMD®) of Santa Clara, Calif., United States. In the illustrated embodiment, the server device 400 includes a chassis 402 that houses the components of the server device 400, only some of which are illustrated in FIG. 4. For example, the chassis 402 may house a memory log retrieval and provisioning subsystem 404 that, in the illustrated embodiment, includes a remote access controller device 406 that may be provided by an iDRAC available from DELL® Inc. of Round Rock, Tex., United States. The remote access controller device 406 includes an out-of-band network connection 406a that may be coupled to the network 204 of FIG. 2, and that one of skill in the art in possession of the present disclosure will recognize is separate from an in-band network connection (not illustrated, but which may include a Network Interface Controller (NIC)) provided for the server device 300. However, one of skill in the art in possession of the present disclosure will recognize that the remote access controller 406 may be provided by a Baseboard Management Controller (BMC) and/or other components with similar functionality to that described below while remaining within the scope of the present disclosure as well.

The chassis 402 may also house a plurality of memory devices 408a, 408b, and up to 408c, any or all of which may be provided by Dual Inline Memory Modules (DIMMS), although other memory devices will benefit from the teachings of the present disclosure and thus are envisioned as falling within its scope as well. Each of the memory devices are coupled to the memory log retrieval and provisioning subsystem 404 via, for example, one or more couplings to the remote access controller device 406 that may provide a sideband interface 410 that is included in the memory log retrieval and provisioning subsystem 304. In a specific example, the sideband interface 410 may be provided by an $I^2C$ bus, although other sideband interfaces are envisioned as falling within the scope of the present disclosure as well. Furthermore, as discussed below, each of the memory devices 408a-c may include a storage device (e.g., an Electrically Erasable Read Only Memory (EEPROM) device) that is configured to store memory logs (e.g., Serial Presence Detect (SPD) logs) generated in response to the operation of that memory device. While a specific server device 400 has been illustrated and described, one of skill in the art will recognize that server devices may include a variety of components and/or component configurations for performing conventional server device functionality, as well as the functionality discussed below, while remaining within the scope of the present disclosure as well.

Figure 5:
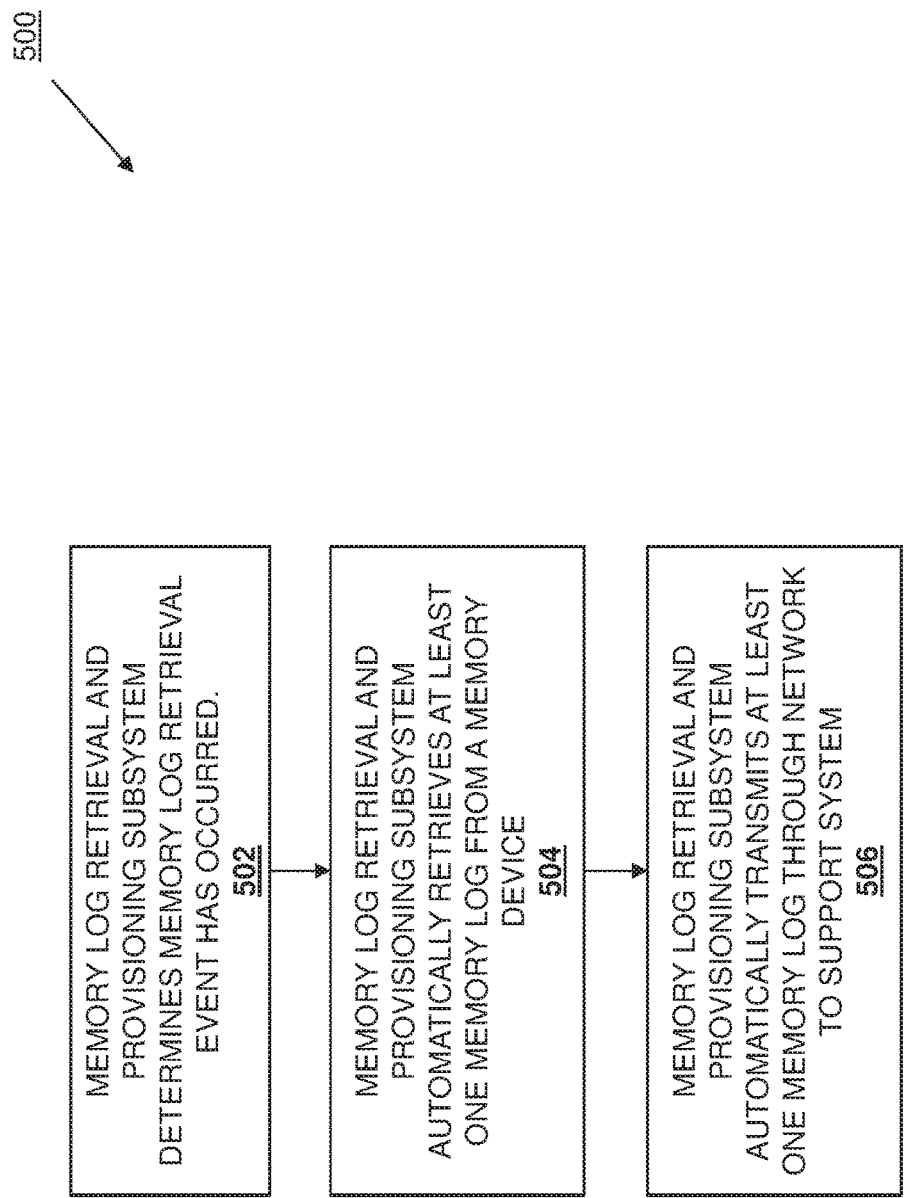
FIG. 5 is a flow chart illustrating an embodiment of a method for retrieving and provisioning memory logs.

Referring now to FIG. 5, an embodiment of a method 500 for retrieving and provisioning memory logs is illustrated. As discussed below the systems and methods of the present disclosure provide for the automation of the process of retrieving memory logs (e.g., SPD logs) from memory devices in a server device, and providing those memory logs through a network to a support system. As discussed above, in server devices including server components manufactured by AMD® of Santa Clara, Calif., United States, there is no conventional method for accessing the SPD logs on DIMMs included in those server devices, and thus no conventional means for providing the SPD logs through a network to a support system. Furthermore, in server devices including server components manufactured by INTEL® corporation of Santa Clara, Calif., United States, an operating system tool must be installed in the operating system on the server device in order to access the SPD logs on the DIMMs. As such, when a critical event occurs in a DIMM included in a server device including INTEL® server components, a customer support system must request that the customer retrieve the OS tool, and/or provide that OS tool to the customer, so that the customer may install that OS tool on the operating system of the server device in order to retrieve the SPD logs from that DIMM, and then that customer must send the SPD logs to the customer support system (e.g., via email.)

The systems and methods of the present disclosure solve these issues via a memory log retrieval and provisioning subsystem that determines that a memory log retrieval event has occurred in its server device and, in response, automatically retrieves the at least one memory log from one or more memory devices. The memory log retrieval and provisioning subsystem may then automatically transmit the at least one memory log through the network to the support system. In embodiments that utilize server devices such that those discussed above that include server components manufactured by AMD® of Santa Clara, Calif., United States, the memory log retrieval and provisioning subsystem includes a remote access controller device that is coupled to the memory devices via a sideband interface (e.g., an $I^2C$ bus), and may operate to automatically retrieve the at least one memory log from the one or more memory devices via that sideband interface, and transmit the at least one memory log via an out-of-band network connection to a support system. As such, the retrieval of SPD logs from memory devices is enabled in server devices such as those including server components manufactured by AMD® of Santa Clara, Calif., United States, with that retrieval process automated, and the subsequent provisioning of those memory logs to a support system automated as well.

In embodiments that utilize server devices such that those discussed above that include server components manufactured by INTEL® corporation of Santa Clara, Calif., United States, the memory log retrieval and provisioning subsystem includes a remote access controller device that is coupled to a service module included in an operating system engine, and a BIOS that is coupled to the service module and each of the memory devices. The service module is configured to automatically issue an SMI to the BIOS in response to determining that the memory log retrieval event has occurred, and the BIOS will automatically retrieve the at least one memory log from the one or more memory devices in response to receiving that SMI. The BIOS may then transmit the at least one memory log to the service module, and the service module will provide the at least one memory log to the remote access controller device so that the remote access controller device may automatically transmit the at least one memory log through the network to the support system. As such, the retrieval of SPD logs from memory devices is automated in server devices such as those including server components manufactured by INTEL® corporation of Santa Clara, Calif., United States, and the subsequent provisioning of those memory logs to a support system is automated as well.

The method 500 begins at block 502 where a memory log retrieval and provision subsystem determines a memory log retrieval event has occurred. In some embodiments, at block 502, the memory log retrieval event detected by the memory log retrieval and provisioning subsystem may include detecting a server device support data collection event that is configured to collect a variety of support data from the server device, and provide that support data to the support system 206. For example, a server device may utilize SUPPORTASSIST® available from DELL® Inc. of Round Rock, Tex., United States, which may include providing support software on the server device (which may include software that provides the memory log retrieval and provisioning subsystem) that is configured to collect server device support data and provide that server device support data to the support system. As such, one of skill in the art in possession of the present disclosure will recognize that such server device support data collections, and server device support data collection events, may be regularly schedule (hourly, daily, weekly, monthly, yearly, and/or at any other reoccurring time), or may be instructed by a user as desired at any time. In other embodiments, at block 502, the memory log retrieval event detected by the memory log retrieval and provisioning subsystem may include detecting a critical memory device event that causes critical memory event data to be stored in memory log(s) of a memory device. For example, such critical memory device events may include any event occurring in a DIMM that causes SPD data to be stored in SPD logs in the memory device (e.g., a DIMM error, a DIMM failure, etc.)

With reference to FIG. 3, in some embodiments of block 502, the remote access controller device 306 in the memory log retrieval and provisioning subsystem 304 may determine that a server device support data collection event (e.g., scheduled or user initiated, as discussed above) should occur, and instruct the service module 308a to initiate memory log retrieval. With continued reference to FIG. 3, in other embodiments of block 502, the service module 308a in the memory log retrieval and provisioning subsystem 304 may detect the memory log retrieval event in response to detecting (or being informed of) a critical memory device event occurring in one or more of the memory devices 312a-c. With reference to FIG. 4, in some embodiments of block 502, the remote access controller device 406 in the memory log retrieval and provisioning subsystem 404 may determine that a server device support data collection event (e.g., scheduled or user initiated, as discussed above) should occur. With continued reference to FIG. 4, in other embodiments of block 502, the remote access controller device 406 in the memory log retrieval and provisioning subsystem 404 may detect the memory log retrieval event in response to detecting (or being informed of) a critical memory device event occurring in one or more of the memory devices 312a-c. For example, sensors coupled to the memory device(s) 408a-c may inform an iDRAC of a critical memory device event. While a few specific examples have been provided, one of skill in the art in possession of the present disclosure will recognize that the memory log retrieval event of the present disclosure may include a variety of events that call for the retrieval of memory logs (which may be default events, events defined by a user/administrator of the server device 300/400, etc.), and a variety of components in the server device 300/400 may operate to help the memory log retrieval and provisioning subsystem 304/404 determine that those memory log retrieval events have occurred while remaining within the scope of the present disclosure.

The method 500 proceeds to block 504 where the memory log retrieval and provision subsystem automatically retrieves at least one memory log from a memory device. With reference to FIG. 3, in an embodiment of block 504 and in response to detecting the memory log retrieval event at block 502, the service module 308a may automatically issue an SMI to the BIOS 310 via the SMI interface 311. For example, the automatic issuing of the SMI by the service module 308a may occur in direct response to detecting the memory retrieval event and without receiving user instructions subsequent to detecting the memory retrieval event. In response to detecting the SMI issued by the service module 308a, the BIOS 310 may automatically retrieve at least one memory log from the memory devices 312a-c. For example, the automatic retrieval of the at least one memory log by the BIOS 310 may occur in direct response to detecting the SMI issued by the service module 308a and without receiving user instructions subsequent to receiving that SMI. In a specific example, at block 504 and in response to detecting the SMI issued by the service module, the BIOS 310 may generate and send a memory log request to one or more the memory devices 312a-c, and the memory device(s) 312a-c receiving that memory log request will operate to retrieve their memory log(s) and provide those memory log(s) to the BIOS 310. With reference to FIG. 4, in an embodiment of block 504 and in response to detecting the memory log retrieval event at block 502, the remote access controller 406 may automatically retrieve at least one memory log from the memory devices 408a-c. For example, the automatic retrieval of the at least one memory log by the remote access controller 406 may occur in direct response to detecting the memory log retrieval event and without receiving user instructions subsequent to detecting the memory log retrieval event. In a specific example, at block 504 and in response to the remote access controller device 406 detecting the memory log retrieval event, the remote access controller 406 may generate and send a memory log request to one or more of the memory devices 408a-c via the sideband interface 410, and the memory device(s) 408a-c receiving that memory log request will operate to retrieve their memory log(s) and provide those memory log(s) to the remote access controller 406 via the sideband interface 410.

In some embodiments, the memory log request sent by the memory log retrieval and provisioning subsystem 304/404 may be directed at a particular memory device (e.g., a memory device that experienced a critical memory device event, a memory device subject to memory log collection as per the server device support data collection event discussed above, etc.), a subset of the memory devices 312*a-c*/408*a-c* (e.g., a subset of the memory devices 312*a-c*/408*a-c* that each experienced a critical memory device event, a subset of the memory devices 312*a-c*/408*a-c* subject to memory log collection as per the server device support collection event discussed above, etc.), and/or all of the memory devices 312*a-c*/408*a-c* (e.g., all of the memory devices 312*a-c*/408*a-c* that each experienced a critical memory device event, all of the memory devices 312*a-c*/408*a-c* including a subset that each experienced a critical memory device event, a subset of the memory devices 312*a-c*/408*a-c* subject to memory log collection as per the server device support collection event discussed above, etc.). While a few specific examples have been provided, one of skill in the art in possession of the present disclosure will recognize that any combination of the memory devices in a server device may have their memory logs collected at block 504 for any reason while remaining within the scope of the present disclosure. Furthermore, in embodiments in which one or more memory devices in a server device experience a critical memory device event, the retrieval of memory logs from those memory devices (as well as other memory devices in some embodiments) may be performed immediately following the detection of the critical memory device event, although delays between the detection of critical memory device events and the retrieval of memory logs will fall within the scope of the present disclosure as well.

The method 500 proceeds to block 506 where the memory log retrieval and provision subsystem automatically transmits the at least one memory log through a network to a support system. With reference to FIG. 3, in an embodiment of block 506 and in response to receiving the at least one memory log from the memory devices 312*a-c* at block 504, the BIOS 310 may automatically provide the at least one memory log to the service module 308*a*. For example, the automatic provisioning of the at least one memory log by the BIOS 310 to the service module 308*a* may occur in direct response to retrieving the at least one memory log and without receiving user instructions subsequent to retrieving the at least one memory log. In response to receiving the at least one memory log from the BIOS 310, the service module 308*a* may automatically provide the at least one memory log to the remote access controller device 306. For example, the automatic provisioning of the at least one memory log by the service module 308*a* to the remote access controller 306 may occur in direct response to receiving the at least one memory log and without receiving user instructions subsequent to receiving the at least one memory log. In response to receiving the at least one memory log from the service module 308*a*, the remote access controller device 306 may automatically transmit the at least one memory log via the out-of-band network connection 306*a* and through the network 204 to the support system 206. For example, the automatic transmittal of the at least one memory log by the remote access controller 306 may occur in direct response to receiving the at least one memory log and without receiving user instructions subsequent to receiving the at least one memory log.

With reference to FIG. 4, in an embodiment of block 506 and in response to receiving the at least one memory log from the memory devices 312*a-c* at block 504, the remote access controller device 406 may automatically transmit the at least one memory log via the out-of-band network connection 406*a* and through the network 204 to the support system 206. For example, the automatic transmittal of the at least one memory log by the remote access controller device 406 may occur in direct response to receiving the at least one memory log and without receiving user instructions subsequent to receiving the at least one memory log. In some embodiments of block 506, the remote access controller device in the memory log retrieval and provisioning subsystem may transmit the at least one memory log as part of the server device support data collection as discussed above, while in other embodiments of block 506, the remote access controller device in the memory log retrieval and provisioning subsystem may transmit the at least one memory log by itself (e.g., in response to the detection of a critical memory device event), or along with any combination of data that would be apparent to one of skill in the art in possession of the present disclosure.

In an embodiment, following the receipt by the support system 206 of the at least one memory log, one or more support devices included in the support system 206 may analyze, process, and/or otherwise utilize the at least one memory log to determine information about the server device that includes the memory devices that generated those memory logs. As discussed above, the analysis of the at least one memory log may be part of a service device support data collection (e.g., performed via SUPPORTASSIST® available from DELL® Inc. of Round Rock, Tex., United States) that may determine a variety of information about that server device that may include or depend on the memory device information included in the memory logs. Furthermore, the analysis of the at least one memory log may provide memory-device-specific support that may determine a variety of information about the memory device that generated that at least one memory log (e.g., in a critical memory device event.) While a few examples have been discussed, the memory log analysis may be performed by a variety of devices to determine a variety of different information while remaining within the scope of the present disclosure.

Thus, systems and methods have been described that provide for the determination that a memory log retrieval event has occurred in a server device and, in response, the automatically retrieval of at least one memory log from one or more memory devices, followed by the automatically transmittal the at least one memory log through the network to a support system. In embodiments that include AMD® manufactured server components in server devices having memory devices, the memory log retrieval and provisioning subsystem includes a remote access controller device that is coupled to the memory devices via n I²C bus, and may operate to automatically retrieve at least one memory log from the one or more of the memory devices via that sideband interface, and transmit the at least one memory log via an out-of-band network connection to a support system. In embodiments that utilize INTEL® manufactured server components in server devices having memory devices, the memory log retrieval and provisioning subsystem includes a remote access controller device that is coupled to a service module included in an operating system engine, and a BIOS that is coupled to the service module and each of the memory devices. The service module automatically issues an SMI to the BIOS in response to determining that the memory log retrieval event has occurred, and the BIOS will automatically retrieve the at least one memory log from the one or more memory devices in response to receiving that SMI. The BIOS may then transmit the at least one memory log to the service module, and the service module will provide the at least one memory log to the remote access controller device so that the remote access controller device may automatically transmit the at least one memory log through the network to the support system. As such, the retrieval of SPD logs from DIMMs is enabled and automated in server devices utilizing AMD® manufactured server components, and automated in server devices utilizing INTEL® manufactured server components.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory log retrieval and provisioning system, comprising:
    a support system; and
    a server device that is coupled to the support system via a network, wherein the server device includes:
        a processing system; and
        a memory system that is coupled to the processing system and that includes instructions that, when executed by the processing system, cause the processing system to provide an operating system engine;
        a memory device that is included in the memory system and that includes a storage device and at least one memory module, wherein the storage device is dedicated to the memory device and includes at least one memory log generated in response to operation of the memory device; and
        a memory log retrieval and provisioning subsystem that is coupled to the memory device, wherein the memory log retrieval and provisioning subsystem includes:
            a service module that is included in the operating system engine and that is configured to automatically issue a Service Management Interrupt (SMI) either in response to determining that a memory log retrieval event has occurred in the server device or in response to instructions issued by a remote access controller;
            a Basic Input/Output System (BIOS) that is coupled to the operating system engine and that is configured to:
                receive the SMI and, in response, automatically retrieve, without user instructions subsequent to detecting the memory log retrieval event, the at least one memory log from the storage device that is dedicated to the memory device; and
                automatically provide the at least one memory log to the service module; and
            a remote access controller that operates independently from the processing system and that is configured to:
                receive the at least one memory log from the service module; and
                automatically transmit, without user instructions subsequent to receiving the at least one memory log, the at least one memory log via an out-of-band network connection through the network to the support system.

2. The system of claim 1, wherein the memory log retrieval event includes a server device support data collection event that is configured to collect support data from the server device and provide that support data through the network to the support system.

3. The system of claim 1, wherein the memory log retrieval event includes a critical memory device event that causes critical event memory data to be stored in the at least one memory log.

4. The system of claim 1, wherein the remote access controller device is configured to automatically retrieve the at least one memory log from the memory device via a sideband interface.

5. The system of claim 1, wherein the at least one memory module includes a Dual Inline Memory Module (DIMM) and the at least one memory log includes a Serial Presence Detect (SPD) log.

6. An Information Handling System (IHS), comprising:
    a processing system; and
    a memory system that is coupled to the processing system and that includes instructions that, when executed by the processing system, cause the processing system to provide an operating system engine;
    a memory device that is included in the memory system and that includes a storage device and at least one memory module, wherein the storage device is dedicated to the memory device and stores at least one memory log generated in response to operation of the memory device; and
    a memory log retrieval and provisioning subsystem that is coupled to the memory device, wherein the memory log retrieval and provisioning subsystem includes:
        a service module that is included in the operating system engine and that is configured to automatically issue a Service Management Interrupt (SMI) either in response to determining that a memory log retrieval event has occurred or in response to instructions issued by a remote access controller;
        a Basic Input/Output System (BIOS) that is coupled to the operating system engine and that is configured to:
            receive the SMI and in response, automatically retrieve, without user instructions subsequent to detecting the memory log retrieval event, the at least one memory log from the storage device that is dedicated to the memory device; and
            automatically provide the at least one memory log to the service module; and
        a remote access controller that operates independently from the processing system and that is configured to:
            receive the at least one memory log from the service module; and
            automatically transmit, without user instructions subsequent to receiving the at least one memory log, the at least one memory log via an out-of-band network connection through a network to a support system.

7. The IHS of claim 6, wherein the memory log retrieval event includes a support data collection event that is configured to collect support data from the IHS and provide that support data through the network to the support system.

8. The IHS of claim 7, wherein the memory log retrieval event includes a critical memory device event that causes critical event memory data to be stored in the at least one memory log.

9. The IHS of claim 8, wherein the at least one memory log is automatically retrieved immediately following detection of the critical memory device event.

10. The IHS of claim 7, wherein the remote access controller that is configured to automatically retrieve the at least one memory log from the memory device via a sideband interface.

11. The IHS of claim 7, wherein the at least one memory module includes a Dual Inline Memory Module (DIMM) and the at least one memory log includes a Serial Presence Detect (SPD) log.

12. A method for retrieving and providing memory logs, comprising:
automatically issuing, by a service module that is provided as part of a memory log retrieval and provisioning subsystem and that is included in an operating system engine provided by a processor included in a server that is coupled to a remote access controller, a Service Management Interrupt (SMI) in response to determining that a memory log retrieval event has occurred in response to instructions issued by the remote access controller that operates independently from the processor, that is provided as part of the memory log retrieval and provisioning subsystem, and that is coupled to the operating system engine;
receiving, by a Basic Input/Output System (BIOS) that is provided as part of the memory log retrieval and provisioning subsystem and that is coupled to the operating system engine, the SMI and, in response, automatically retrieving without user instructions and subsequent to the determining the memory log retrieval event occurred, at least one memory log from a memory device that includes a storage device and at least one memory module, wherein the storage device is dedicated to the memory device and stores the at least one memory log that is generated in response to operation of the memory device; and
automatically providing, by the service module, the at least one memory log to the remote access controller; and
automatically transmitting, by the remote access controller without user instructions, the at least one memory log via an out-of-band network connection through a network to a support system.

13. The method of claim 12, wherein the memory log retrieval event includes a support data collection event that is configured to collect support data from a server device that includes the memory device, and provide that support data through the network to the support system.

14. The method of claim 12, wherein the memory log retrieval event includes a critical memory device event that causes critical event memory data to be stored in the at least one memory log.

15. The method of claim 14, wherein the at least one memory log is automatically retrieved immediately following detection of the critical memory device event.

16. The method of claim 12, wherein the automatically retrieving, the at least one memory log from the memory device is via a sideband interface.

17. The method of claim 12, wherein the at least one memory module includes a Dual Inline Memory Module (DIMM) and the at least one memory log includes a Serial Presence Detect (SPD) log.

* * * * *

UNITED STATES PATENT AND TRADEMARK OFFICE
CERTIFICATE OF CORRECTION

PATENT NO. : 11,163,718 B2  
APPLICATION NO. : 16/174380  
DATED : November 2, 2021  
INVENTOR(S) : Rao et al.

Page 1 of 1

It is certified that error appears in the above-identified patent and that said Letters Patent is hereby corrected as shown below:

In the Claims

Claim 4, Column 12, Line 11, "device" should be deleted.

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*